(12) United States Patent
De Godoy et al.

(10) Patent No.: US 7,679,250 B2
(45) Date of Patent: Mar. 16, 2010

(54) DEVICE FOR FIXING PERMANENT MAGNETS INSIDE THE CYLINDER HEAD OF A FIELD WINDING OF AN ELECTRICAL ENGINE

(75) Inventors: Marcos De Godoy, Americana (BR); Marius Drozdek, Villette d' Anthon (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/558,655

(22) PCT Filed: Jun. 1, 2004

(86) PCT No.: PCT/FR2004/001339

§ 371 (c)(1),
(2), (4) Date: Feb. 12, 2007

(87) PCT Pub. No.: WO2004/107528

PCT Pub. Date: Dec. 9, 2004

(65) Prior Publication Data

US 2007/0126301 A1 Jun. 7, 2007

(30) Foreign Application Priority Data

May 30, 2003 (FR) .................................. 03 06562

(51) Int. Cl.
H02K 21/26 (2006.01)
H02K 21/28 (2006.01)

(52) U.S. Cl. ............................. 310/154.14; 310/154.15

(58) Field of Classification Search ............ 310/154.15, 310/154.14, 154.16–154.19
See application file for complete search history.

(56) References Cited

U.S. PATENT DOCUMENTS 3,790,830 A 2/1974 Bonfiglio
4,580,072 A 4/1986 Morishita
4,587,449 A * 5/1986 West ...................... 310/154.27
4,745,319 A 5/1988 Tomite et al.
5,763,974 A * 6/1998 Vacca ......................... 310/152
2002/0063485 A1 * 5/2002 Lee et al. ................ 310/154.15

FOREIGN PATENT DOCUMENTS

EP 1 061 632 A1 12/2000
FR 2588427 4/1987
JP 2003125546 A * 4/2003
WO WO 9638900 A1 * 12/1996

OTHER PUBLICATIONS

International Search Report for PCT/FR2004/001339 dated Nov. 29, 2004 (3 pages).
Patent Abstract from esp@cenet for EP1061632 dated Dec. 20, 2000 (1 page).
Patent Abstract from esp@cenet for FR2588427 dated Apr. 10, 1987 (1 page).

* cited by examiner

Primary Examiner—Quyen Leung
Assistant Examiner—Alex W Mok
(74) Attorney, Agent, or Firm—Osha • Liang LLP

(57) ABSTRACT

The invention relates to a device for fixing permanent magnets inside the cylinder head of a field winding of an electric engine. The inventive device comprises spring clips (12) which are disposed between the permanent magnets in order to ensure the angular positioning and the axial and radial support of said magnets against the inner wall of the head. The end of each clip (12) which first penetrates the head when the permanent magnets are being inserted, comprises means for axially sliding on the inner cylindrical wall of the head, while preventing any contact with an end edge of the clip. Moreover, the clip is set apart from the head by means of at least one boss (17) which is provided on the core (16), and said boss is in turn set back from the edge and disposed between two fins (14) for the axial locking of the magnets.

23 Claims, 4 Drawing Sheets

DEVICE FOR FIXING PERMANENT MAGNETS INSIDE THE CYLINDER HEAD OF A FIELD WINDING OF AN ELECTRICAL ENGINE

TECHNICAL FIELD OF THE INVENTION

The invention relates to a device for fixing permanent magnets inside the cylinder head of a field winding of an electrical engine, particularly an electrical starter for an automobile, comprising elastic spring clips which are disposed between the permanent magnets to assure the angular positioning and axial and radial support of said magnets against the internal wall of the cylinder head, each clip being made from a metallic sheet comprising a core for holding two consecutive magnets.

PRIOR ART

A permanent magnet engine of an electrical starter comprises a fixed field winding forming the stator, and a rotating armature forming the rotor coupled to the motor starter. The field winding is comprised of a tubular metallic head wherein the internal wall supports a plurality of heteropolar permanent magnets, designed to produce an inductor field. The permanent magnets are shaped according to cylindrical segments, by being angularly distributed at regular intervals within the cylinder head, and separated uniformly from the armature by a radial gap.

The fixation of the permanent magnets on the internal wall of the cylinder head is generally performed by means of spring clips extending in the longitudinal direction in intervals disposed between the permanent magnets. The fixation of spring clips ensures the following functions in a manner that is known:

- separation between the magnets to create a uniform inductor field in the gap;
- axial and radial support of the magnets in the cylinder head by opposing the mechanical forces (vibrations, shocks), and the forces of magnetic attraction during operation of the engine;
- immobilization in rotation of magnets by opposing the torque developed by the armature;
- stable angular positioning between the magnets and the collector brushes to allow a correct commutation of the engine.

Different types of clipping of permanent magnets are known:

- either by using independent clips having a U-shaped profile, made from a folded metallic sheet, provided with flaps for the radial support of the magnets. One clip is inserted between two consecutive permanent magnets, therefore there are as many clips as magnets. The clips are not interconnected. The support of the clips on the internal wall of the cylinder head is performed by radial insertion of pins in the holes of the clips. Another known solution proposes clipping and positioning the clips in abutment on the bosses or internal teeth of the cylinder head.
- or by mounting the clips on a banded annulus gear allowing the totality of permanent magnets to be supported. The annulus and spring clip assembly may be manufactured by cutting and folding the same metallic sheet, and the fixation of the clips to the cylinder head is identical to that described previously.
- or by using two support annulus gear, in circular sections and in a metallic sheet, designed to maintain the opposed extremities of the permanent magnets. Setting indices are provided on the annulus gear for the positioning of magnets. Circular annulus gear are fixed inside the cylinder head by the same methods as above.

In all cases described previously, the magnets comprise a sub assembly with the spring clips or circular annulus gear. This sub assembly is axially fitted into the cylinder head, then positioned and immobilized by pins or clips.

The spring clips necessitate good elastic properties. Therefore, they are made from steel with a high hardness value.

Regarding the cylinder head, to allow passage of the largest possible magnetic flux, the head is made from mild steel, therefore at a low hardness value.

During an imprecise introduction of the sub assembly into the cylinder head, the spring clips or circular support annulus gear may engage and scrape the inner wall of the cylinder head, with the following inconveniences:

- formation of chips by stripping the cylinder head material. The magnetic attraction of these chips to the surface of the permanent magnets risks contaminating the inside of the electrical engine, and disturbing the proper rotation of the armature with relation to the field winding;
- deformation of these spring clips, making mounting of the sub assembly into the cylinder head impossible.

This results in a risk of non quality on the mounting and on the correct operation of the starter.

To avoid these disadvantages, the axial insertion operation becomes delicate and necessitates:

- a precise centering of the magnets and spring clips sub assembly with relation to the cylindrical head;
- and a slow insertion speed.

These requirements therefore slow down the throughput, and involve additional manufacturing costs.

OBJECT OF THE INVENTION

The object of the invention is to relieve these disadvantages and to facilitate the axial introduction and positioning of the permanent magnet field winding in the cylinder head of the electrical engine.

According to the invention, the extremity of each spring clip first penetrates in the cylinder head during the insertion of permanent magnets, comprises means facilitating the axial sliding on the cylindrical inner wall of the cylinder head by avoiding all contact with an end edge of said clip.

According to a preferential embodiment, the end edge of each spring clip that penetrates first into the cylinder head is set apart from the cylinder head by at least one boss situated on the core set back from the end edge, and between two axial locking fins of the magnets. The core of each spring clip is curved by pressing against the internal wall of the cylinder head.

Such a device therefore allows a dual objective to be reached, consisting first of facilitating the axial mounting of the spring clips and magnets assembly without deterioration of the field winding and secondly of assuring the axial and radial support of the magnets with a precise centering with relation to the cylinder head.

According to an embodiment, the end edge of each spring clip is set apart from the cylinder head by a wedge-shaped tongue.

SHORT DESCRIPTION OF THE DRAWINGS

Other advantages and characteristics will emerge more clearly from the description that will follow of a mounting method according to the invention given by way of a non-limiting example, and represented in the attached drawings, in which.

DESCRIPTION OF PREFERENTIAL EMBODIMENTS OF THE INVENTION

Figure 1:
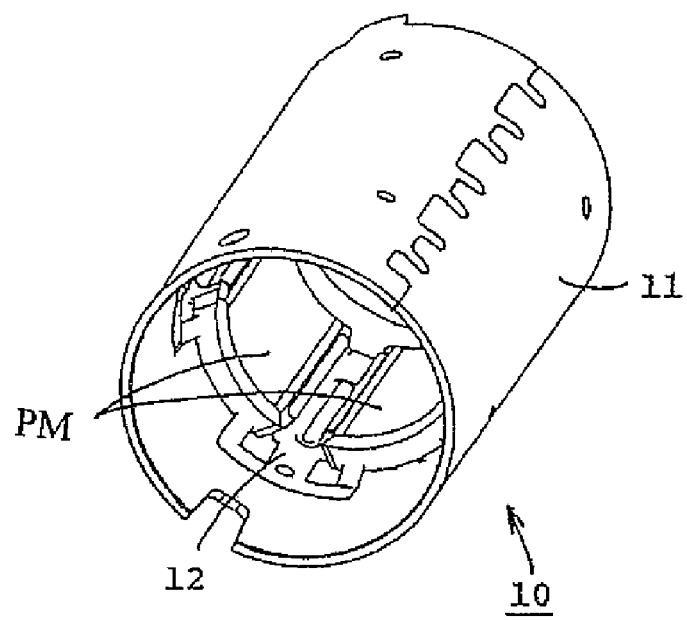
FIG. 1 shows a schematic perspective view of a permanent magnet field winding assembled to the cylinder head by spring clips according to the invention.
Figure 2:
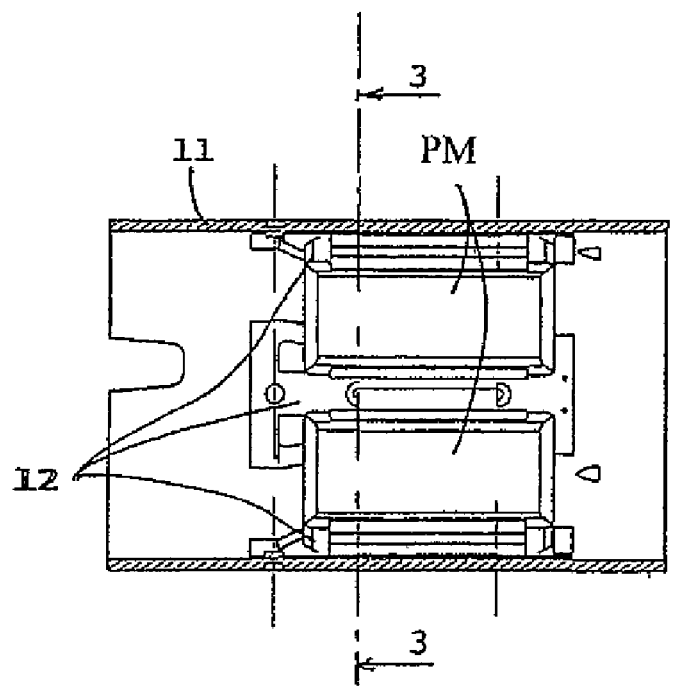
FIG. 2 shows a longitudinal sectional view according to line 2-2 of FIG. 3.
Figure 3:
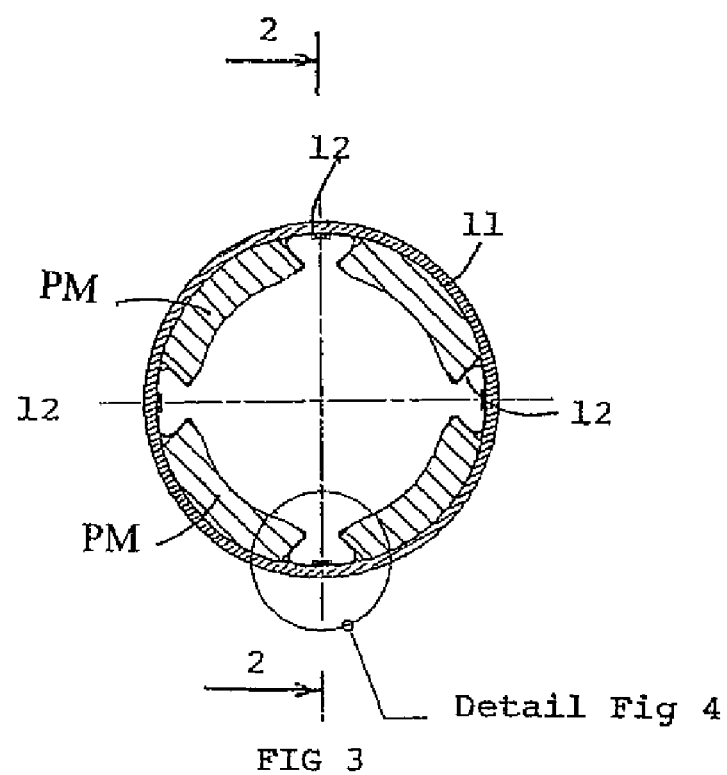
FIG. 3 represents a transversal section view according to line 3-3 of FIG. 2.
Figure 4:
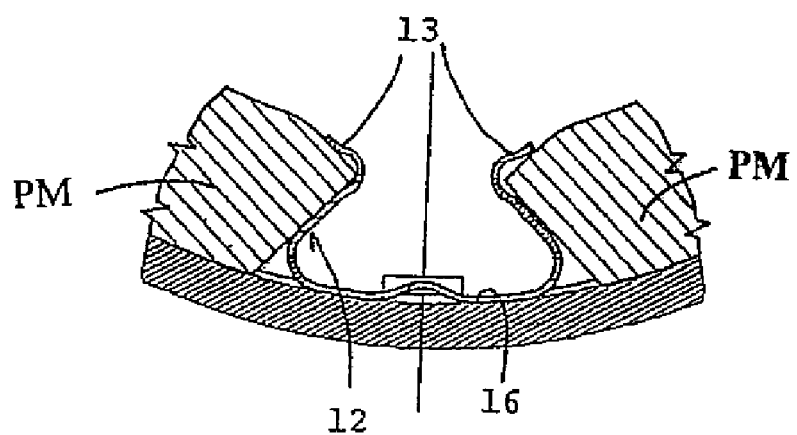
FIG. 4 is a detail view of a spring clip of FIG. 3.
Figure 5:
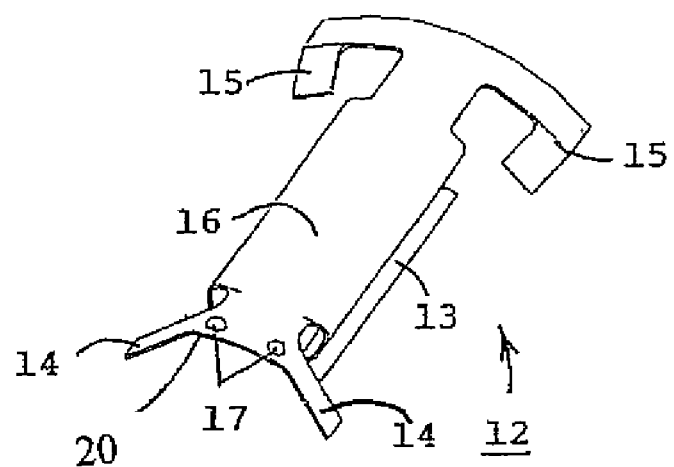
FIG. 5 shows a perspective view of a spring clip according to the invention.
Figure 6:
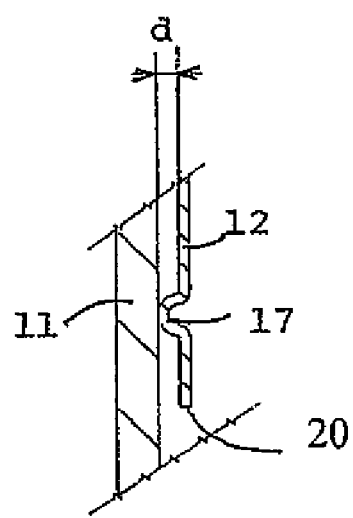
FIG. 6 represents a partial sectional view of the extremity of the spring clip of FIG. 5 disposed on the cylinder head.

In FIGS. 1 to 6 and 9 the field winding 10 is comprised of a tubular metallic cylinder head 11, and a plurality of permanent magnets PM in cylindrical segment forms, angularly distributed at regular intervals inside the cylinder head 11 in soft iron. The axial and radial support of the magnets PM in the cylinder head 11 is performed by means of elastic spring clips 12 inserted between the magnets PM. Each spring clip 12 is constructed from a metallic sheet, for example folded into a U and equipped with flaps 13 in the central area for the radial support of magnets PM. Locking fins 14, 15 are advantageously provided in the extremities of the spring clips 12 to assure the stable axial positioning of the permanent magnets PM. In a position of fixation, the curved core 16 of each spring clip 12 pushes against the internal wall of the cylinder head 11.

In a first phase, the set of permanent magnets PM and spring clips 12 is assembled in a specific tool. In a second phase, the tool is activated to tighten the assembly, and to position the assembly on a diameter that is slightly less than that of the inside of the cylindrical cylinder head 11. In a third phase, the cylinder head 11 just partially covers the assembly, and the tool is activated to loosen the assembly that, under the effect of the spring clips 12 that make a spring, lies flat on the inner diameter of the cylinder head 11. The field winding 10 is then removed from the tool to be placed in a clamp that terminates the axial insertion of the assembly into the cylinder head 11.

To prevent the spring clips 1 from engaging on the inner wall of the cylinder head 11, a first solution (FIGS. 5 and 6) consists of providing two bosses 17 in rounded forms, which are constructed onto the spring clips during the cutting operation. These bosses 17 are for example disposed between the two fins 14 at the extremity 20 penetrating first into the cylinder head, in such a way as to facilitate the sliding of the spring clips 12 on the inner wall of the cylinder head 11. Each spring clip 12 is set back from the inner wall of the cylinder head 11 by a small radial interval d. Contact between the end edge cutout of the spring clip 12 and the cylinder head us therefore prevented.

Figure 7:
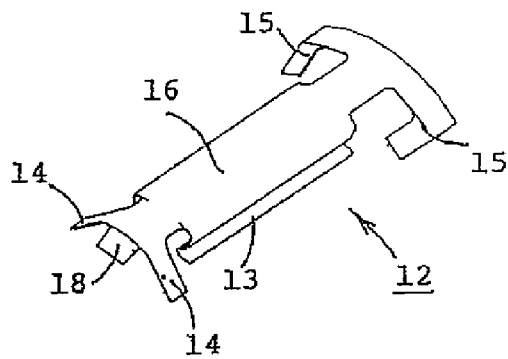
FIG. 7 is a view identical to FIG. 5 of a variation of embodiment.
Figure 8:
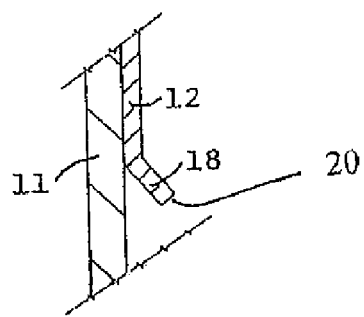
FIG. 8 represents a partial section view of the extremity of the spring clip of FIG. 7 disposed on the cylinder head.
Figure 9:
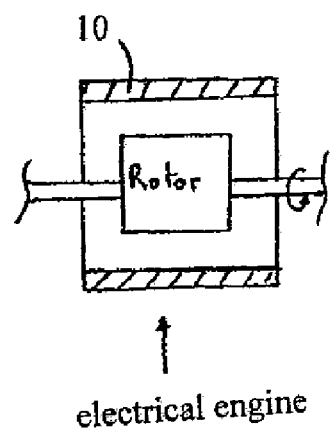
FIG. 9 shows a perspective view of an electrical engine of a starter of an automobile having a permanent magnet field winding according to one or more embodiments of the invention.

In a second embodiment illustrated in FIGS. 7 and 8, the extremity 20 of the spring clip 12 of the side of the fins 14 is folded towards the center of the cylinder head 11 by forming a wedge-shaped tongue 18 designed to prevent contact of the live end edge against the inner surface of the cylinder head 11 during the course of insertion.

The invention claimed is:

1. An electrical engine of a starter of an automobile comprising:
a cylinder head of a field winding having an inner wall;
a plurality of permanent magnets;
at least one spring clip for fixing said plurality of permanent magnets inside the cylinder head, the spring clip comprising:
a longitudinally extending main body configured to be placed between two consecutive permanent magnets to maintain said magnets against the inner wall of the cylinder head, the main body defining a locking end and a distal end; the distal end being opposite the locking end in the longitudinal direction, wherein the main body has a first side configured to face toward the inner wall of the cylinder head and a second side configured to face toward an interior portion of the cylinder head; and
at least one boss disposed proximate the distal end, spaced from the distal and locking ends, and protruding from the first side of the main body to prevent contact between the wall of the cylinder head and the distal end of the main body, said boss being in contact with a continuous surface of the inner wall of the cylinder head upon mounting of the spring clip on the cylinder head.

2. The engine according to claim 1, wherein the spring clip further comprises two axial locking fins at the locking end.

3. The engine according to claim 1, wherein the spring clip further comprises two axial locking fins at the distal end.

4. The engine according to claim 3, wherein the boss is disposed proximate the distal end between said two axial locking fins.

5. The engine according to claim 1, wherein the longitudinally extending main body is curved laterally about a longitudinal axis thereof.

6. The engine according to claim 1, wherein the longitudinally extending main body has a longitudinal flap on a lateral side for holding the two consecutive permanent magnets.

7. The engine according to claim 1, wherein the spring clip has a U-shape.

8. The engine according to claim 1, wherein the boss has a round shape.

9. The engine according to claim 1, wherein the spring clip comprises a plurality of bosses.

10. The engine according to claim 9, wherein the plurality of bosses are equidistant from the distal end.

11. The engine according to claim 1, wherein the boss is spaced from an end edge portion of the distal end.

12. The engine according to claim 1, wherein the spring clip is constructed from a metallic sheet.

13. An electrical engine of a starter of an automobile comprising:
a cylinder head of a field winding having an inner wall;
a plurality of permanent magnets;
at least one spring clip for fixing said plurality of permanent magnets inside the cylinder head, the spring clip comprising:
a longitudinally extending main body configured to be placed between two consecutive permanent magnets to maintain said magnets against the inner wall of the cylinder head, the main body extending between a locking end and a circularly curved distal end; the circularly curved distal end being opposite the locking end in the longitudinal direction, wherein the main body has a first side configured to face toward the inner wall of the cylinder head and a second side configured to face toward an interior portion of the cylinder head; and at least one tongue comprising two lateral sides and extending from the circularly curved distal end opposite to the locking end toward a center of the cylinder head, said circularly curved distal end being substantially in contact with the inner wall of the cylinder head; and at least one boss disposed proximate the distal end, spaced from the distal and locking ends, and protruding from the first side of the main body to prevent contact between the wall of the cylinder head and the distal end of the main body, said boss being in contact with a continuous surface of the inner wall of the cylinder head upon mounting of the spring clip on the cylinder head.

14. The engine according to claim 13, wherein the spring clip further comprises two axial locking fins at the locking end.

15. The engine according to claim 13, wherein the spring clip further comprises two axial locking fins at the distal end.

16. The engine according to claim 15, wherein the tongue is disposed between said two axial locking fins.

17. The engine according to claim 13, wherein the longitudinally extending main body is curved laterally about a longitudinal axis thereof.

18. The engine according to claim 13, wherein the longitudinally extending main body has a longitudinal flap on a lateral side for holding two consecutive permanent magnets.

19. The engine according to claim 13, wherein the spring clip has a U-shape.

20. The engine according to claim 13, wherein the spring clip is constructed from a metallic sheet.

21. The engine according to claim 13, wherein the tongue is folded.

22. An electrical engine of a starter of an automobile comprising:

a device for fixing permanent magnets inside a cylinder head of a field winding, said device comprising:
at least one spring clip for fixing the permanent magnets inside the cylinder head comprising:
a longitudinally extending main body configured to be placed between two consecutive permanent magnets to maintain said magnets against the inner wall of the cylinder head, the main body defining a locking end and a distal end; the distal end being opposite the locking end in the longitudinal direction, wherein the main body has a first side configured to face toward the inner wall of the cylinder head and a second side configured to face toward an interior portion of the cylinder head; and
at least one boss disposed proximate the distal end, spaced from the distal and locking ends, and protruding from the first side of the main body to prevent contact between the wall of the cylinder head and the distal end of the main body,
wherein the spring clip is retained without the need for a cut-out in the cylinder head.

23. An electrical engine of a starter of an automobile comprising:
a device for fixing permanent magnets inside a cylinder head of a field winding, said device comprising:
at least one spring clip for fixing the permanent magnets inside the cylinder head comprising:
a longitudinally extending main body configured to be placed between two consecutive permanent magnets to maintain said magnets against an inner wall of the cylinder head, the main body extending between a locking end and a distal end; the distal end being opposite the locking end in the longitudinal direction, wherein the main body has a first side configured to face toward the inner wall of the cylinder head and a second side configured to face toward an interior portion of the cylinder head;
at least one boss disposed proximate the distal end, spaced from the distal and locking ends, and protruding from the first side of the main body to prevent contact between the wall of the cylinder head and the distal end of the main body, said boss being in contact with a continuous surface of the inner wall of the cylinder head upon mounting of the spring clip on the cylinder head; and
the device further comprising at least one tongue comprising two lateral sides and extending from a circularly curved end opposite to the locking end toward a center of the cylinder head, said circularly curved end being substantially in contact with the inner wall of the cylinder head.

* * * * *